United States Patent [19]

Thimons et al.

[11] Patent Number: 5,648,169

[45] Date of Patent: Jul. 15, 1997

[54] GLASS FIBER SIZE AND MAT

[75] Inventors: Thomas V. Thimons, Allison Park; Robert G. Swisher; Yongsheng Hou, both of Pittsburgh, all of Pa.

[73] Assignee: PPG Industries, Inc., Pittsburgh, Pa.

[21] Appl. No.: 433,583

[22] Filed: May 3, 1995

Related U.S. Application Data

[62] Division of Ser. No. 146,267, Oct. 29, 1993, Pat. No. 5,437,928.

[51] Int. Cl.$^6$ .................................................. B32B 9/00
[52] U.S. Cl. ................... 428/391; 428/361; 428/378; 427/212; 427/204; 525/29; 523/206; 523/209; 523/217
[58] Field of Search ............................ 427/212, 387; 523/204, 206, 416, 209, 217, 410; 524/265, 160; 525/29, 101, 106; 260/309, 404.5, 29, 29.7 H, 42.15, 42.18; 428/391, 361, 378

[56] References Cited

U.S. PATENT DOCUMENTS

| | | | |
|---|---|---|---|
| 2,200,815 | 5/1940 | Ackley | 260/309 |
| 2,881,194 | 4/1959 | Peerman et al. | 260/404.5 |
| 3,292,013 | 12/1966 | Golahny | 307/88.5 |
| 3,484,223 | 12/1969 | Vanderbilt et al. | 65/3 |
| 3,556,754 | 1/1971 | Marsden et al. | 65/3 |
| 3,597,265 | 8/1971 | Mecklenborg et al. | 117/126 GR |
| 3,664,909 | 5/1972 | Ackley | 161/141 |
| 3,684,645 | 8/1972 | Temple et al. | 161/141 |
| 3,713,962 | 1/1973 | Ackley | 161/154 |
| 3,840,148 | 10/1974 | Fontana | 221/153 |
| 3,882,068 | 5/1975 | Swartz | 260/29.6 |
| 3,883,333 | 5/1975 | Ackley | 65/2 |
| 3,909,477 | 9/1975 | Madison et al. | |
| 3,915,681 | 10/1975 | Ackley | 65/9 |
| 3,936,415 | 2/1976 | Coakley | |
| 3,940,357 | 2/1976 | Fahey | 260/29.3 |
| 3,944,707 | 3/1976 | Foley et al. | 428/391 |
| 4,158,557 | 6/1979 | Drummond | 226/171 |
| 4,196,273 | 4/1980 | Imai et al. | 528/15 |
| 4,208,000 | 6/1980 | Drummond | 226/171 |
| 4,248,935 | 2/1981 | Temple | 428/392 |
| 4,277,531 | 7/1981 | Picone | 428/228 |
| 4,278,586 | 7/1981 | Marzola et al. | |
| 4,335,176 | 6/1982 | Baumann | 428/228 |
| 4,338,233 | 7/1982 | Das et al. | 523/410 |
| 4,338,234 | 7/1982 | Moore et al. | 523/206 |
| 4,345,927 | 8/1982 | Picone | |
| 4,369,264 | 1/1983 | Baumann et al. | 523/209 |
| 4,377,498 | 3/1983 | Temple | 252/431 |
| 4,391,876 | 7/1983 | Tamosauskas eet al. | 428/392 |
| 4,404,717 | 9/1983 | Neubauer et al. | 65/9 |
| 4,448,917 | 5/1984 | Black et al. | 524/160 |
| 4,455,343 | 6/1984 | Temple | 428/285 |
| 4,489,131 | 12/1984 | Black et al. | 428/391 |
| 4,615,946 | 10/1986 | Temple | |
| 4,728,573 | 3/1988 | Temple | 428/378 |
| 4,897,298 | 1/1990 | Otawa et al. | 428/122 |
| 5,130,197 | 7/1992 | Temple | |
| 5,141,802 | 8/1992 | Parrinello et al. | 428/288 |

OTHER PUBLICATIONS

Chemical Coupling of Glass–Filled Polyproplene Using Acid or Anhydride Modified Polypropylenes, R.C. Constable & A.M. Adur, BP Chemicals, Hackettstown, NJ (1892–1896/ANTEC '91).

Performance Enhancement in Glass Fiber Reinforced Polypropylene Obatined by the Addition of Acrylic Acid Grafted Polypropylene, Ashok M. Adur, Robert C. Constable & Joseph A. Humenik, BP Performance Polymers, Inc., Hackettstown, NJ, Proceedings of the SPI/C1 44 Annual Conference, pp. 1–5 of Sessions 11–A.

U.S. Ser. No. 07/906,772 filed Jun. 30, 1992 entitled "Reaction Products of Chain–Extended Polyamine Compounds and Fatty Acid–Containing Materials".

U.S. Ser. No. 08/144,847 filed Oct. 29, 1993 entitled "Fiber Reinforced Functionalized Polyolefin Composites".

*Primary Examiner*—Merrick Dixon
*Attorney, Agent, or Firm*—Carl T. Severini; Linda Pingitore

[57] ABSTRACT

Aqueous peroxide-free size compositions for application to glass fibers contain, as essential components, a reaction product of a polymeric amine and an amine-reactable organosilane, a film-forming polymer and an emulsified polyolefin. The reaction product can be preformed or made in situ, and is preferably the product of a polyalkylene polyamine and an epoxy-functional alkoxysilane. An optional added component is a water-soluble, non-volatile carboxylic acid. Glass fibers treated with the size composition can be made into mats, especially continuous strand, needled mats, useful for reinforcing thermoplastic polymers such as polypropylene in laminates which then can be used in molding processes to make articles of good physical properties.

13 Claims, No Drawings

GLASS FIBER SIZE AND MAT

This is a divisional of application Ser. No. 08/146,267, filed Oct. 29, 1993, now U.S. Pat. No. 5,437,928.

This invention relates to an improved sizing composition for glass fibers useful in making mats suitable for use as reinforcement for thermoplastic polymers such as polypropylene.

Glass fibers and glass fiber strands, often in the form of chopped glass fiber mats and continuous strand mats, are used to add strength to polymeric materials. The glass fibers are conventionally treated, shortly after they are formed, with a composition, often called a size, which provides lubricating and protective properties to the fibers, and assists in providing strength and other properties to the reinforced polymers and the products made therefrom.

Specific treating compositions, or sizes, have been developed for use in particular applications and with various types of polymeric materials. For example, certain sizes have been developed for application to glass fibers used to make mats for use with thermoplastic polymers such as polypropylene and other polyolefins. Many of these contain a peroxide in order to promote adhesion between the glass fibers and the polymer and thus for the reinforced material or composite to have good strength and other necessary properties when molded or otherwise fabricated. See, for example, U.S. Pat. Nos. 3,840,148; 4,369,264; 4,377,498; 4,391,876; and 4,455,343.

Many of the sizes used heretofore do not provide the desired level of properties when used on fibers to reinforce thermoplastic polymers, while others, such as peroxide-containing compositions, involve environmental and safety considerations. Further, fibers having thereon peroxide-containing sizes present processing problems because they are usually air-dried so as to avoid high temperatures at which the peroxide may volatilize.

The present invention provides a sizing composition for glass fibers which, when used to reinforce thermoplastic polymers, result in a thermoplastic polymer composite having good fabricating and molding characteristics and which do not require a peroxide in order to achieve such a result.

SUMMARY OF THE INVENTION

In accordance with the invention, glass fibers and mats made therefrom suitable for use in reinforcing thermoplastic polymers comprise glass fibers treated with an aqueous peroxide-free composition which includes a polymeric amine and an amine-reactable organosilane, along with a film-forming polymer and an emulsified polyolefin, and, optionally, a water-soluble, non-volatile carboxylic acid. The polyamine and organosilane normally react to form a reaction product, which can be preformed and added to the composition before application to the glass fibers. Alternatively, when the polymeric amine and organosilane themselves are included in the composition, the reaction product least partially forms in situ, during the formulation of the composition or its application drying.

Glass fibers having thereon a dried residue of the above composition, when made into mats and used to reinforce thermoplastic polymers, provide reinforced composites and laminates of excellent strength, which have good flow and other properties when molded or shaped into various articles, including articles of complex shapes.

DETAILED DESCRIPTION OF THE INVENTION

The glass fibers employed in the invention can be any of the fibers known in the art for such purpose and which are made, for example, as described in the U.S. Pat. No. 2,133,238. The fibers are treated with the aqueous composition described herein, usually as they are formed, and then dried and made into a mat or otherwise utilized in any manner known in the art.

As indicated, these compositions can be substantially peroxide-free, by which is meant that the composition contains little or no peroxide, i.e. usually none, but in any event less than the amount which has often been considered desirable in sizes for glass fibers for use with thermoplastic polymers such as polypropylene.

The invention is particularly useful with glass fibers made into continuous strand mats, especially needled mats made without a binder, such as those described in U.S. Pat. Nos. 3,292 013; 3,664,909; 3,684,645; 3,713,962; 4,277,531; and 4,335 176.

The size composition with which the fibers are treated comprises, as essential components, (a) a polymeric amine;
(b) an amine-reactable organosilane;
(c) a film-forming polymer; and
(d) an emulsified polyolefin.

An optional additional component, but one which is usually included, is a water-soluble, non-volatile carboxylic acid.

The polymeric amine and organosilane react to form a reaction product which is described in copending application Ser. No. 07/906,772, filed Jun. 30, 1992. Also described in that application is the use of the reaction product in sizes employed to treat glass fibers for use in making woven fabric or cloth. While the reaction product which is one component of the treating composition herein can be the same as that described in the aforesaid application, the specific treating composition herein is not so described and use of the fibers treated in accordance with the present invention to make mat is. also not described.

The reaction product can be obtained from a wide variety of polymeric amines and organosilanes, provided the polymeric amine contains at least two and preferably three or more reactive amine groups, normally free primary or secondary amine groups, and the organosilane contains at least one amine-reactable group.

The preferred polymeric amines are those of the formula $H_2N-(C_nH_{2n}NH)_x-H$ where n is 2 to 6 and x is 2 to 28, preferably 2 to 6. Such polyalkyleneamines include diethylenetriamine, triethylenetetramine, tetraethylenepentamine, pentaethylenehexamine, dipropylenetriamine, tripropylenetetramine, tetrapropylenepentamine, pentapropylenehexamine, and dihexamethylenetriamine. Mixtures of these are also suitable and in many cases the polyalkyleneamine is chain-extended in the manner discussed below.

Among other polymeric amines which can be usefully employed in the reaction product are polyamines containing fatty acid moieties, polyamine-polyamides, acylated polyamines and other amidoamine polymers, condensation products of polyalkylamines with polyfunctional acids, and polyalkyleneimines. Some examples of suitable polymeric amines are further described in the aforesaid copending patent application and in U.S. Pat. Nos. 3,597,265 and 2,881,194.

The polymeric amine component may also be chain-extended variations of the foregoing, such as those produced by reacting the polyamine with difunctional materials which are reactive with amine groups to provide predominantly linear compounds of increased molecular weight. Compounds containing carboxyl, ester, epoxy, isocyanates, halo or other moieties reactive with amine groups, and especially diesters, diepoxies and diacids, can be used in this manner to effect chain extension.

A specific preferred polyamine is tetraethylenepentamine chain-extended with diethyl succinate and octanoic acid to a molecular weight of about 1500, sold as "Alubraspin 230" by PPG Industries, Inc.

The organosilane which is reacted with the polymeric amine to form the reaction product used herein is most commonly an epoxy-functional alkoxysilane, i.e. a silane having at least one epoxy-functional organic moiety and up to three alkoxy groups. The hydrolysis product of the alkoxysilane, in which the alkoxy groups are at least partially hydrolyzed to hydroxyl groups, can also be used and is often preferred, although the hydrolysis is best carried out just prior to the reaction with the polymeric amine. While alkoxy (or hydroxy) substituted silanes are readily available and are preferred, any organosilane that has at least one amine-reactable group, i.e. a group which reacts with the amine groups of the polymeric amine, can be used. The amine-reactable group is preferably an epoxy group, but compounds containing amine-reactable keto groups, isocyanato groups, ester groups, alkylhalo groups, acryloxy groups, and the like, may also be employed.

The preferred class of organosilanes herein can be represented by the formula

$$R_nSi(OR^1)_{4-n}$$

where R is the amine-reactable group, $R^1$ is alkyl (preferably lower alkyl), or hydrogen (in the case of a hydrolysis product), and n is preferably one but may be 2 or 3.

Some specific useful organosilanes are gamma-glycidoxymethyltrimethoxysilane delta-glycidoxybutyltrimethoxysilane 3,4-epoxycyclohexylethyltrimethoxysilane 3-(isocyanato)propyltriethoxysilane gamma-isocyanatopropyltriethoxysilane gamma-methacryloxypropyltrimethoxysilane gamma-acryloxypropyltriethoxysilane.

The proportions of polymeric amine and organosilane used to make the reaction product are usually from 0.1 to 25 moles of silane per mole of polymeric amine; preferably, the ratio provides for about one mole of organosilane per 1500 number average molecular weight of polymeric amine.

The reaction product can be preformed by mixing the polymeric amine and organosilane, with heating if desired to increase the rate of reaction. A solvent is not necessary unless the viscosity of the reactants is excessive, in which case an alcohol or water can be added. Alternatively, and usually preferably, the reaction product can be formed in situ, i.e. by including polymeric amine and organosilane in the treating composition. In this case, they react during the formulation and/or during application of the composition to the fibers and the subsequent drying.

The second component of the composition is a water-dispersible film-forming polymer. Film formers have been conventionally used in sizes for glass fibers; for example, starch-oil sizes are well known for application to glass fibers for textile use (i.e. for use in woven fabric or cloth). In the present invention, starch is not utilized as a film former.

The film-forming polymer component herein is water-dispersible and thus the polymer itself is usually of relatively low molecular weight (by the term "water-dispersible" is meant soluble or emulsifiable in water). A wide variety of water-dispersible film-forming polymers are known and can be used. The preferred polymers are epoxies, by which is meant compounds or mixtures of compounds having more than 1.0 epoxy groups per molecule. A number of these are disclosed in U.S. Pat. No. 4,728,573. These include polyglycidyl ethers of polyphenols, such as bisphenol A, or of polyhydric alcohols; cycloaliphatic polyepoxides; polymers containing pendent epoxy groups, such as polyglycidyl acrylate; and the like. The preferred epoxies are commercially available products, particularly polyglycidyl ethers of bisphenol A, these often have been modified to provide additional functionality, as by reaction with urethanes to include isocyanato groups. The specific preferred film forming polymer is the epoxy resin sold by Rhone-Polenc as Epi-Rez W60 5520, which is a modified epoxy resin dispersion in water (56% solids). The epoxy resin is understood to be a urethane-modified polyglycidyl ether of bisphenol A having an epoxide equivalent of 520.

Also useful as the film-forming polymer are other synthetic polymers made from various monomers and which, when dried or cured, form a surface film. Examples include polyvinyl halide polymers, acrylic polymers, urethanes, alkyds, aminoplasts, vinyl acetate polymers and copolymers, poly(vinylpyrrolidone), polyesters, and the like.

The composition also includes an emulsified polyolefin, i.e., a stable dispersion of polyolefin in water. Preferred is emulsified polypropylene. Emulsions of polyolefins such as polyethylene and polypropylene are available commercially and are employed in the practice of the invention. Preferred emulsions are those of polypropylene which have been modified to introduce polar groups, as, for example, by free-radical induced grafting of ethylenically unsaturated monomers, such as maleic anhydride or acrylic acid. Usually, the level of such polar groups is quite low, in the range of 0.01 to 1 percent by weight. For instance, commercially available maleic anhydride-modified polypropylene emulsions usually contain about 0.1 percent by weight or less of maleic anhydride. A specific preferred such polyolefin emulsion is sold by National Starch and Chemical Company as Protolube RL-5440, and is a maleic anhydride-modified polypropylene emulsion containing 32 percent solids. Other examples of useful emulsified polyolefins include several products sold by Chemical Corporation of America including those sold as Poly Emulsion 43N40, which is a non-ionic polypropylene emulsion, and Poly Emulsion 43C40, which is a cationic polypropylene emulsion, each of these having about 40 percent solids content.

The compositions used to treat glass fibers as described herein may also contain a non-volatile, water-soluble carboxylic acid (by "non-volatile" is meant a material which does not substantially volatilize at the conditions at which the composition is made and applied; by "water-soluble" is meant soluble in water in the concentration utilized in the composition, both of these terms being used in the sense conventional in the art). Unsaturated acids, such as maleic acid, are preferred, but others such as benzoic acid, oxalic acid, butyric acid, methacrylic acid and the like can also be employed. The carboxylic acid component, while not critical, is important in achieving the desired level of properties in fabricated products made using the glass fibers treated with these compositions along with thermoplastic polymers such as polypropylene.

While the treating composition usually consists essentially of the foregoing components, other additives can be included. These may include such materials as surfactants and low molecular weight acids, such as acetic acid, used to adjust the pH, which is usually between about 3 and about 9, preferably between about 5 and 6.

The proportions of the components of the composition are not critical, in that any effective amount of each of the essential constituents can be used. In general, however, there are employed on a non-aqueous basis:

(a) from about 4 to about 32 percent by weight of the reaction product of the polymeric amine and the organosilane, it being understood that instead of the reaction product itself, the composition usually includes the polymeric amine and the organosilane in amounts which if fully reacted would produce the above amount of the reaction product in situ; thus, the amounts of polymeric amine and organosilane usually employed are from about 2 to about 22 percent by weight of polymeric amine and from about 2 to about 10 percent by weight of organosilane;

(b) from about 5 to about 20 percent by weight of the water-dispersible film-forming polymer; and (c) from about 50 to about 90 percent by weight of emulsified polyolefin.

When, as is preferred, the composition includes maleic acid (which may be added as the anhydride) or other water-soluble, non-volatile carboxylic acid, the composition contains (again on a non-aqueous basis):

(a) from about 2 to about 19 percent by weight of polymeric amine and from about 2 to about 7 percent by weight of organosilane; or alternatively, from about 3.5 to about 26 percent by weight of the reaction product, (b) from about 6 to about 12.5 percent by weight of the film-forming polymer;

(c) from about 50 to about 85 percent by weight of emulsified polyolefin, and (d) from about 6 to about 15 percent by weight of non-volatile, water-soluble carboxylic acid. These proportions (as are all the proportions herein, unless otherwise indicated) are by weight based on the non-volatile solids of each component; the balance of the composition is water except for minor amounts of any additive materials.

The composition can be prepared by simply mixing the components with water in an amount to achieve the desired total solids content, which is usually in the range of from about 1 to about 15 percent by weight of the total composition. Agitation to facilitate mixing and moderate heating can be employed.

The aqueous composition, i.e. the size, is applied to the glass fibers by any method known to those skilled in the art. The application of the composition to the fiber normally results in strands of fibers that can have up to about 3 weight percent of the size, preferably from around 0.4 to 1.4 weight percent, as determined by loss on ignition (LOI). The LOI test is a well-known technique for determining the amount of size on glass fibers. The diameter of the glass filaments or fibers can range from less than 3 to around 30 microns; and they can be used to make chopped strand, continuous strand or roving, or they can be milled or otherwise made into various forms for use in reinforcing various plastic materials. When used in making mats, there are usually employed fibers with larger diameters, generally 10 to 30 microns, particularly in making the needled continuous strand mats to which the invention is particularly applicable. The glass fibers themselves can be formed by any method known to those skilled in the art by direct or indirect melt processes, with the fibers being formed through orifices in a bushing.

Preferably, water sprays and conditioned air are used to cool the fibers, and the fibers are treated thereafter with the aqueous size shortly after their attenuation from the bushing. In many cases the fibers are drawn from the bushing by a winder, and after the size is applied, the fibers are gathered into one or more strands and wound into an annular package on the winder. Alternatively, the fibers are attenuated by the mechanism being used to produce the mat.

The glass fiber strands with size are dried to reduce the moisture content, usually by heating in an oven at conventional temperatures and times, although air-drying for conventional time periods can also be used. During such drying, especially when carried out at elevated temperatures, some reaction between the various components tends to take place.

The sized fibers can be used to reinforce plastics in any manner known to the art, including in the form of various types of mats and in non-mat forms such as chopped or continuous strands, or rovings, which may be chopped or otherwise processed as desired. Their uses include fabrication processes which commonly utilize non-mat forms, such as injection molding, pultrusion, filament winding, extrusion molding, spray-up molding, thermoforming, or the like, while mats are usually employed in processing involving compression molding, stamping, or the like.

The sized fibers are advantageously formed into a mat, using techniques known in the art. While the invention is applicable to chopped strand mat, a preferred application is in making continuous strand mat and especially needled, continuous strand mat such as that often used in making laminated composites with polypropylene, or to a lesser extent, other thermoplastic polymers such as polyethylene terephthalate.

One use of the sized fibers of the invention is in making the products described in copending application Ser. No. 14667, filed on the same day herewith. Such composites are employed in molding and/or stamping operations to make various articles, and it is in such processes that the advantage of the present invention, in providing excellent properties in the final product, are best realized.

Some of the methods used to make mats and in which glass fibers as treated herein can be employed are described in U.S. Pat. Nos. 3,664,909; 3,684,645; 3,883,333; 3,915,681; 4,158,557; 4,208,000; 4,345,927; and 4,404,717.

The invention is further illustrated by the following examples.

EXAMPLE 1

A size composition was prepared from the following:

TABLE 1

| SIZE COMPOSITION | |
|---|---|
| | Grams |
| Gamma-glycidoxypropyltrimethoxysilane (A-187) | 550 |
| Tetraethylene Pentamine (Alubraspin 230) | 816 |
| Polypropylene emulsion (32% solids) (Protolube RL-5440) | 12,763 |
| Epoxy resin (Epi-Rez CMD W60 5520) | 1,918 |
| Maleic Acid | 1,285 |
| Acetic Acid | 25 |
| Water | sufficient to make 50 gallons |

The size composition was prepared by first adding the acetic acid to 30 liters of water and then hydrolyzing the silane (A-187) in this acetic acid-water solution. The tetra-ethylene pentamine (Alubraspin 230) was softened at 170°–190° F., dissolved in hot water (140°–160° F.), and then added to the silane solution. The polypropylene emulsion (Protolube RL-5440) and epoxy resin (Epi-Rez W60 5520) were each diluted with a small amount of water and then added to the mix. The maleic acid, dissolved in water, was then added. The solids level of the composition thus prepared was 6.52 percent.

Glass fibers with a diameter of 25 microns (nominal) were coated with the above composition using an applicator comprising a rubber belt submerged in the composition, by bringing the glass fibers into contact with the applicator belt. The sized glass fibers were gathered and wound into packages, and the packages were dried by baking at 118° C. for 13 hours.

The sized glass fibers thus prepared contained 0.55 percent by weight of the size composition. They were made into a needled continuous strand mat, without added binder, in accordance with known practice. The sized fibers were fed by a reciprocating feeder across the width of a continuously moving conveyor to form a mat of randomly distributed fibers which was then fed into a needling device containing a number of barbed metal needles.

The glass mat thus prepared had a density of 3.2 oz/ft$^2$, and could be handled and shipped in that form.

A laminate was made by layering the glass mat with polypropylene film (Fina EOD 90-17 100 melt flow homopolymer) and applying pressure (25 psi) at 420° F. for 3.5 minutes, followed by cooling at full pressure for 13 minutes. The laminate thus produced had a glass content of 43 percent by weight. The laminate was heated to 460° for 6 minutes and then shaped into a flat panel at 1000 tons pressure. The resultant panel was cut and tested in accordance with ASTM Procedures for tensile strength, flexural strength and modulus, and Dynatup and Izod Impact. The tensile strength was 16.9 KSI; flexural strength and flexural modulus were 28.0 KSI and 1,000 KSI, respectively; the Izod value was 18 ft-lb/in; the Dynatup test value was 892 lb load at maximum load and 23 ft-lb energy at total energy (specimen thickness 0.125").

EXAMPLE 2

A glass mat was prepared as in Example 1 and then laminated with a different polypropylene film (Fina EOD 90-17 100 melt flow homopolymer dry-blended with Aristech UNITE maleic-modified polypropylene to give a blend with 0.05 percent chemical modification level), using the procedure described in Example 1. The laminates, having glass content of 43 percent, were tested using the same procedures as in Example 1. The values obtained were: 18.7 KSI tensile strength; 31.5 KSI flexural strength and 1094 KSI flexural modulus respectively; 21 lb-ft/in. Izod; and 934 lb load at maximum load and 23.6 lb-ft energy at total energy in Dynatup.

EXAMPLE 3

Glass fibers sized as described in Example 1 were used to make a needled continuous strand mat having a density of 2.0 oz/ft$^2$. This mat was used to make a laminate having 30 percent by weight glass content with the polypropylene homopolymer described in Example 1, and then tested as in that example. The results were as follows: 11.3 KSI in tensile strength; 21.7 KSI in flexural strength and 864 KSI flexural modulus respectively. When used and tested in the same way with the chemically modified polypropylene described in Example 2, the results were: 14.1 KSI in tensile strength; 26.6 KSI in flexural strength and 933 KSI flexural modulus respectively.

EXAMPLES 4–15

Size compositions were prepared following the procedure described in Example 1 and using the components and proportions shown in Table 2. When these compositions were applied to glass fibers and, made into mats which were then laminated as in Examples 1 to 3, the resulting molded panels have comparable physical properties.

TABLE 2

| | Ingredients (g) | | | | | |
|---|---|---|---|---|---|---|
| Example | Organosilane (A-187) | Polymeric Amine (Alubraspin 230) | Polyproylene (RL 5440) | Epoxy Resin (CMD W60-5520) | Maleic Acid | Acetic Acid |
| 4 | 1,090 | 544 | 53,526 | 959 | 1,606 | 49.55 |
| 5 | 550 | 816 | 53,526 | 3,835 | 1,606.5 | 25.00 |
| 6 | 820 | 544 | 40,145 | 959 | 1,928 | 37.27 |
| 7 | 550 | 544 | 26,763 | 1,918 | 1,606.5 | 25.00 |
| 8 | 820 | 1,088 | 53,526 | 3,835 | 1,928 | 37.27 |
| 9 | 1,090 | 816 | 40,145 | 959 | 1,285 | 49.55 |
| 10 | 550 | 816 | 26,763 | 959 | 1,928 | 25.00 |
| 11 | 820 | 544 | 53,526 | 1,918 | 1,285 | 37.27 |
| 12 | 1,090 | 1,088 | 40,145 | 3,835 | 1,606.5 | 49.55 |
| 13 | 550 | 544 | 40,145 | 3,835 | 1,285 | 49.55 |
| 14 | 820 | 1,088 | 26,763 | 959 | 1,606 | 37.27 |
| 15 | 1,090 | 816 | 53,526 | 1,918 | 1,928 | 49.55 |

We claim:

1. An aqueous peroxide-free size composition for treating glass fibers comprising:
   (a) from about 4 to about 32 percent by weight of a reaction product of a polymeric amine and an amine-reactable organosilane;
   (b) from about 5 to about 20 percent by weight of a water-dispersible film-forming polymer; and
   (c) from about 50 to about 90 percent by weight of emulsified polyolefin.

2. The composition of claim 1 in which said reaction product is formed in situ.

3. The composition of claim 1 in which said reaction product is formed from a polyalkylene polyamine and an amine-reactable organosilane selected from the group consisting of epoxy functional alkoxysilane, the hydrolysis product thereof and mixtures thereof.

4. The composition of claim 1 in which said film-forming polymer is an epoxy.

5. The size composition of claim 1 wherein the polymeric amine is a polyalkylene polyamine represented by the formula:

$$H_2N-(C_nH_{2n}NH)_x-H$$

where n is 2 to 6 and x is 2 to 28.

6. The size composition of claim 5 wherein the polyalkylene polyamine is chain extended by reacting the polyamine with difunctional materials which are reactive with amine groups.

7. The size composition of claim 6 wherein the difunctional materials reactive with amine groups contain functional groups selected from the group consisting of carboxyl, ester, epoxy, isocyanate, halo, and mixtures thereof.

8. The size composition of claim 6 wherein the polymeric amine is tetraethylenepentamine chain extended to a molecular weight of about 1500 with diethyl succinate and octanoic acid.

9. The size composition of claim 1 wherein the amine-reactable organosilane is represented by the formula:

$$R_nSi(OR^1)_{4-n}$$

wherein R is an amine reactable group selected from the group consisting of epoxy, keto, isocyanato, ester, alkylhalo and acryloxy groups, $R^1$ is alkyl or hydrogen n is 1 to 3.

10. The size composition of claim 1 wherein the amine-reactable organosilane is an epoxy functional organosilane.

11. The size composition of claim 4 wherein the water dispersible epoxy film forming polymer is a urethane-modified polyglycidyl ether of bisphenol A having an epoxide equivalent of 520.

12. The size composition of claim 1 wherein the emulsified polyolefin is emulsified polypropylene.

13. The size composition of claim 1 wherein the proportion of polymeric amine to organosilane used to make the reaction product is from 0.1 to 25 moles of organosilane for each mole of polymeric amine.

* * * * *